United States Patent [19]

Marshall

[11] Patent Number: 5,655,617
[45] Date of Patent: Aug. 12, 1997

[54] ELASTOMERIC ENERGY STORAGE SYSTEM

[76] Inventor: Herbert K. Marshall, 204 Jansmith La., Raleigh, N.C. 27615

[21] Appl. No.: 306,374

[22] Filed: Sep. 15, 1994

[51] Int. Cl.$^6$ .............................. B60K 6/00; B60K 8/00; B60K 25/10
[52] U.S. Cl. ................ 180/165; 180/54.2; 60/414
[58] Field of Search ................ 180/165, 54.1, 180/54.2, 65.1, 65.2, 65.3, 65.4, 65.5, 65.6; 60/698, 699, 414; 185/41 WW

[56] References Cited

U.S. PATENT DOCUMENTS

| 2,113,750 | 4/1938 | Travis | 180/54.2 |
| 4,532,769 | 8/1985 | Vestermark | 180/165 |
| 4,813,509 | 3/1989 | Harris | 180/54.2 |

*Primary Examiner*—Richard M. Camby
*Attorney, Agent, or Firm*—Mills & Associates

[57] ABSTRACT

This invention is a means for storing kinetic energy for later use as a driving force. This is accomplished through the use of an elastomeric member that can be multi-strand if desired, trained over a plurality of offset pulleys mounted on a pair of parallely disposed support shafts. One end of the elastomeric member is tethered and the other end is connected to a low stretch member which is trained onto a take-up reel. This reel through a remotely controlled clutch is connected to a gear box that is in turn connected to a drive source such as ground engaging wheels. A separate power source can also be connected to the gear box such as an engine. A control means such as a microprocessor can be used in controlling the storage of kinetic energy by winding the low stretch member onto the take-up reel to linearly stretch the elastromeric member and to release the stored energy by allowing the elastomeric member to cause the low stretch member to unwind from the take-up reel.

4 Claims, 5 Drawing Sheets

ELASTOMERIC ENERGY STORAGE SYSTEM

FIELD OF THE INVENTION

This invention relates to propulsion systems and more particularly to energy storage means for such systems.

BACKGROUND OF INVENTION

Substantial amounts of energy are lost during deceleration of propulsion systems. This is particularly true in vehicles where large amounts of kinetic energy is dissipated during slow downs and stops. When braking is used, this energy is normally dissipated as heat.

Over the years various attempts have been made to harness this energy including flywheels into which the energy is transferred during deceleration and is then available for acceleration. Also electric systems have been investigated where the kinetic energy is converted to electricity and stored until needed.

The flywheel concept of storing deceleration kinetic energy has the advantage of being a kinetic energy transfer means but is not a long term storage system since the flywheel itself will decelerate and eventually stop due to friction losses.

Although the electrical storage systems store energy for longer periods of time than the flywheel, they are inefficient and will eventually discharge if not used over an extended period of time.

Rubber bands have, of course, been used in model airplanes and other vehicles as a primary propulsion means but this, first, does not store the energy from deceleration and, secondly, considerable energy is lost due to friction in the twisting and untwisting process. In addition, this friction would render this method of energy storage unacceptable for use in a system of the type disclosed since friction causes excessive wear.

Concise Explanation of Prior Art

Applicant is not aware of any prior art references disclosing storage of braking kinetic energy in elastomeric members for later use in acceleration.

BRIEF DESCRIPTION OF INVENTION

After much research and study into the above mentioned problems, the present invention has been developed to provide a low friction means for permanently storing kinetic energy until the same is needed.

The above is accomplished by stretching elastomeric members during deceleration which permanently stores the kinetic energy created by such deceleration until the same is needed, at which time such energy is reintroduced into the system for acceleration.

A limit switch is provided to disengage a gear box when maximum energy has been stored. That same gear box, through clutches, controls the energy going into and the energy going out of the elastomeric energy storage system of the present invention.

In view of the above it is an object of the invention to provide a means for permanently storing deceleration energy for later use in acceleration.

Another object of the present invention is to provide a low friction elastomeric kinetic energy storage system.

Another object of the present invention is to provide controls for the storing of deceleration kinetic energy and the release of such energy for acceleration.

Another object of the present invention is to provide a gear box and clutches for controlling the storage and release of kinetic energy.

Another object of the present invention is to provide an elastomeric kinetic energy storage means which includes a limit switch to disengage an associated gear box when maximum energy has been stored.

Another object of the present invention is to provide a trailer that is used for the storage and release of deceleration and acceleration kinetic energy.

Another object of the present invention is to provide a trailer having elastomeric members that linearly store deceleration kinetic energy until the same is needed for acceleration.

Other objects and advantages of the present invention will become apparent and obvious from a study of the following description and the accompanying drawings which are merely illustrative of such invention.

DETAILED DESCRIPTION OF INVENTION

Figure 1:
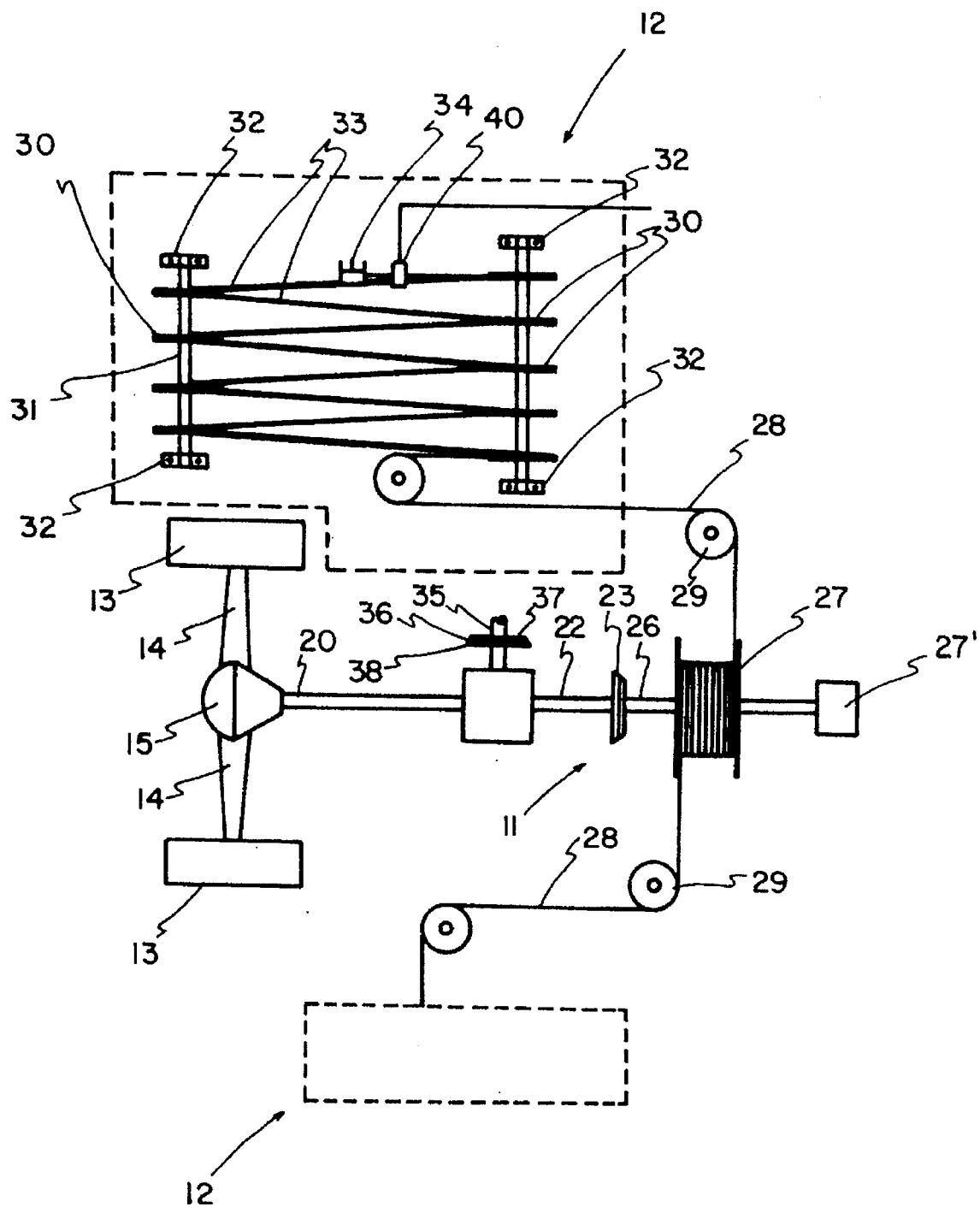
FIG. 1 is a schematic view of the elastomeric energy storage system of the present invention used in conjunction with the drive system of a vehicle.

The energy storage system shown schematically in FIG. 1 is indicated generally at 10 and include a vehicle portion, indicated generally at 11, and energy storage portions, indicated generally at 12.

If the energy storage system of the present invention is used in conjunction with a vehicle, the same will include ground contacting wheels 13 mounted on axles 14 which are operatively connected to a differential 15. The differential 15 is operatively connected to drive shaft 16. Since ground engaging wheels, axles, differentials and drive shafts are all well known to those skilled in the art, further detailed discussion of the same is deemed unnecessary.

A drive shaft 20 is operatively connected to differential 15 at one end and to forward and reverse gear box 21 at its other end. Drive shaft 22 is operatively connected to gear box 21 on one end and to the clutch plate 24 of the drive clutch 23. Clutch plate 25 of drive clutch 23 is operatively connected to drive shaft 26 on one end and take-up reel 27 on the other end. Also a reel limit brake 27' is mounted on the outer end of shaft 26 adjacent reel 27.

At least a pair of transmission cables 28 are connected to the take-up reel 27 on opposite sides thereof. These cables are trained over one or more energy transmission pulleys 29 from the vehicle portion 11 of the present invention into the energy portion 12 thereof.

Figure 2:
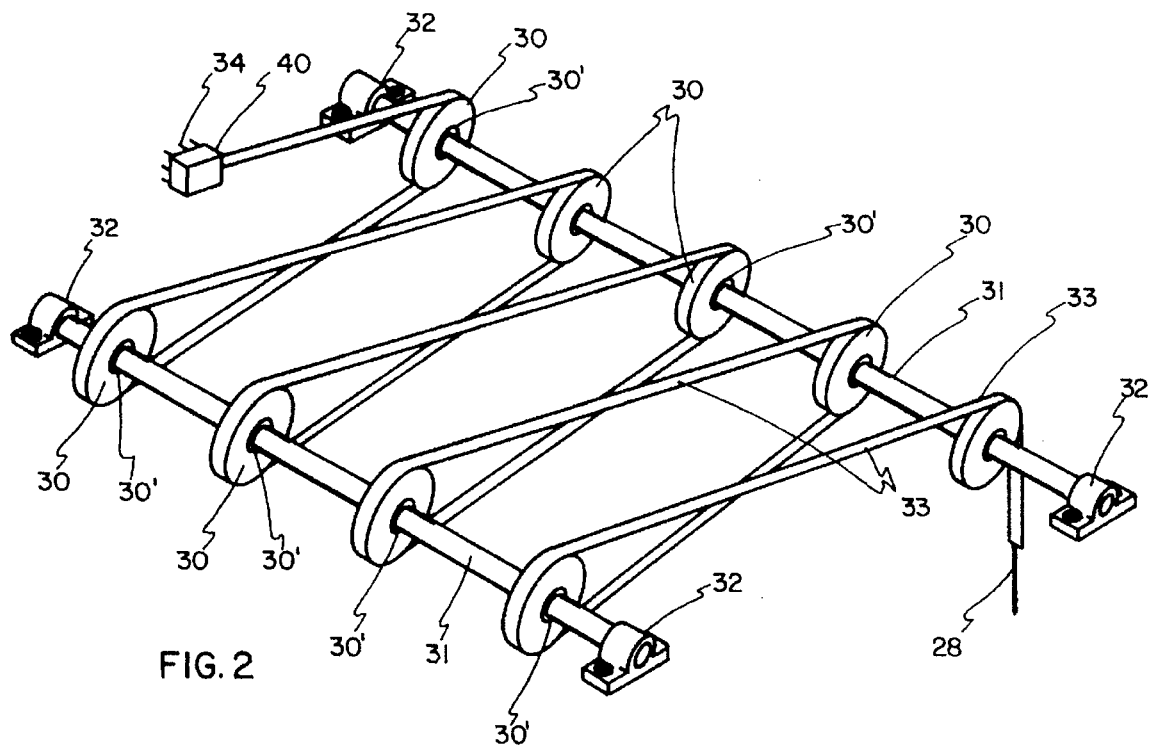
FIG. 2 is a perspective view of the energy storage portion of the present invention.
Figure 3:
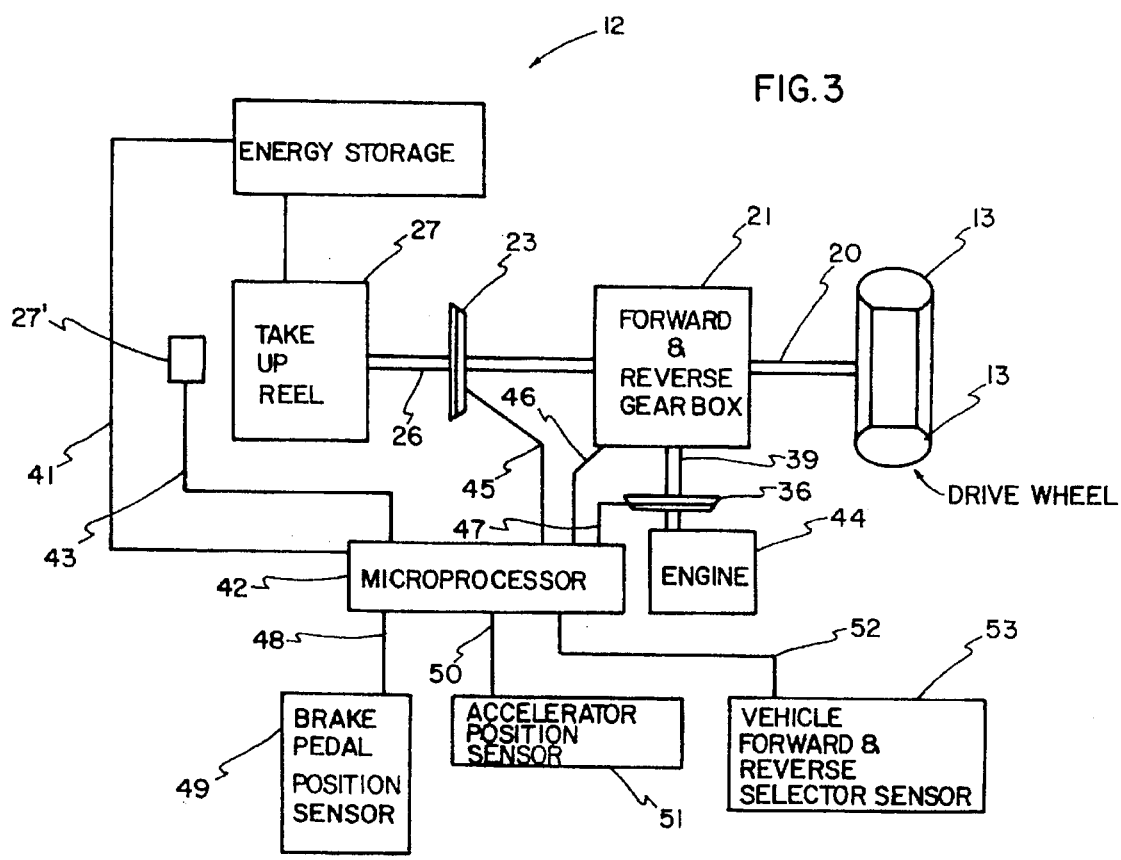
FIG. 3 is a somewhat schematic side elevational view of a trailer with the energy storage system of the present invention operatively mounted thereon.
Figure 4:
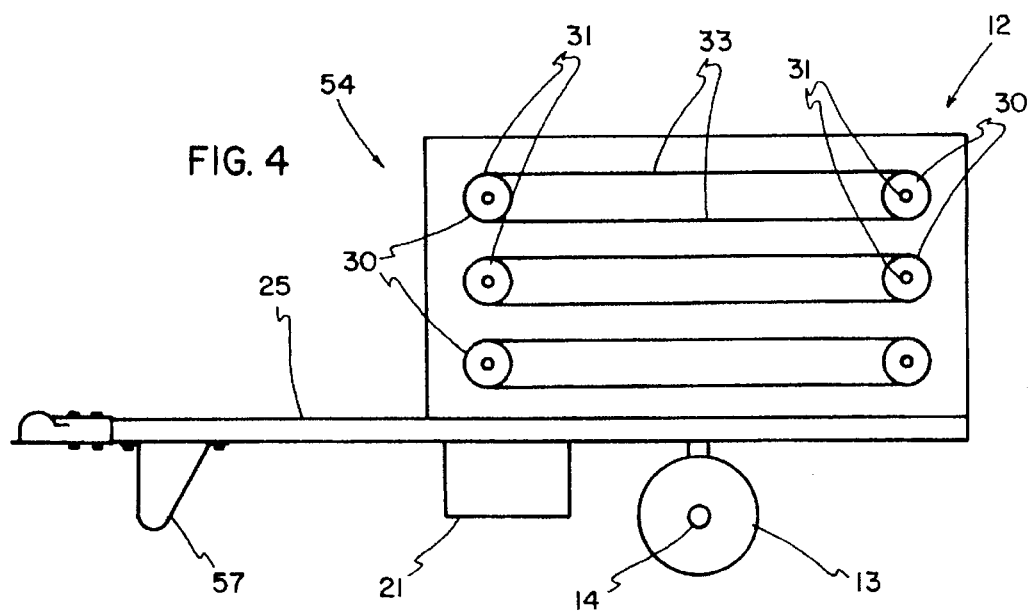
FIG. 4 is a top plan view of the trailer shown in FIG. 3.
Figure 5:
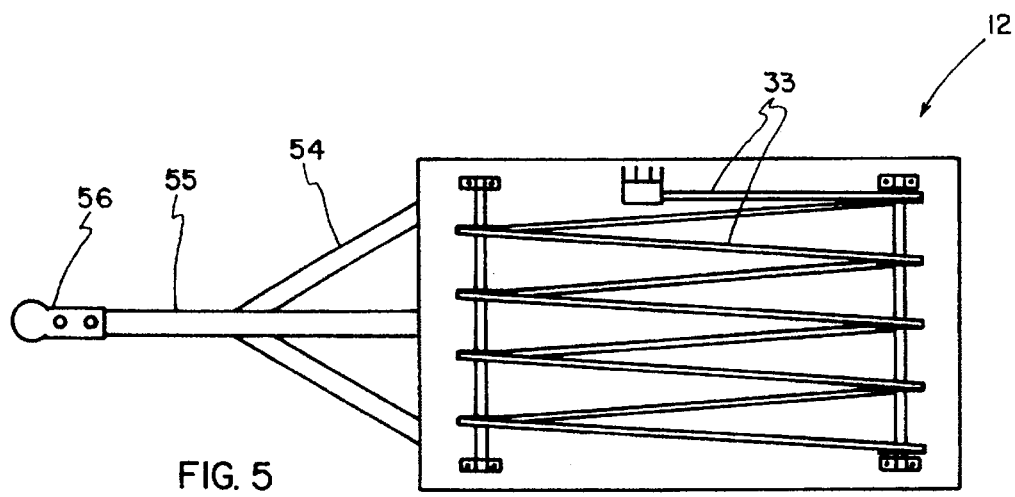
FIG. 5 is an elevational view of the take-up reel with two transmission cables operatively connected thereto.

Within the energy storage portion 12 are a plurality of offset energy storage pulleys 30 that are freely rotatively mounted on shaft bearings 30' which are supported on a pair of parallely disposed support shafts 31 as can clearly be seen in FIG. 2. Support brackets 32 are provided on opposite ends of each of the shafts 31.

An elastomeric band 33 is fixedly attached at one end to anchor attachment 34 and is trained over at least a portion of the energy storage pulleys 30 and is attached at its other end to transmission cable 28.

The linear strength and thus available power of the elastomeric storage system of the present invention can be adjusted by changing the length of the elastomeric bands 33 and the number of strands making up said bands. Also the diameter of the take-up reel or reels 27 can be changed to adjust the torque delivered to the various drive shafts and ultimately to the ground engaging wheels 13.

Figure 6:
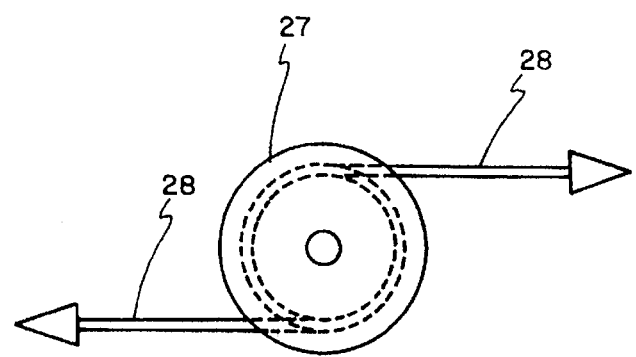
FIG. 6 is an elevational view of the take-up reel with three transmission cables operatively connected thereto.
Figure 7:
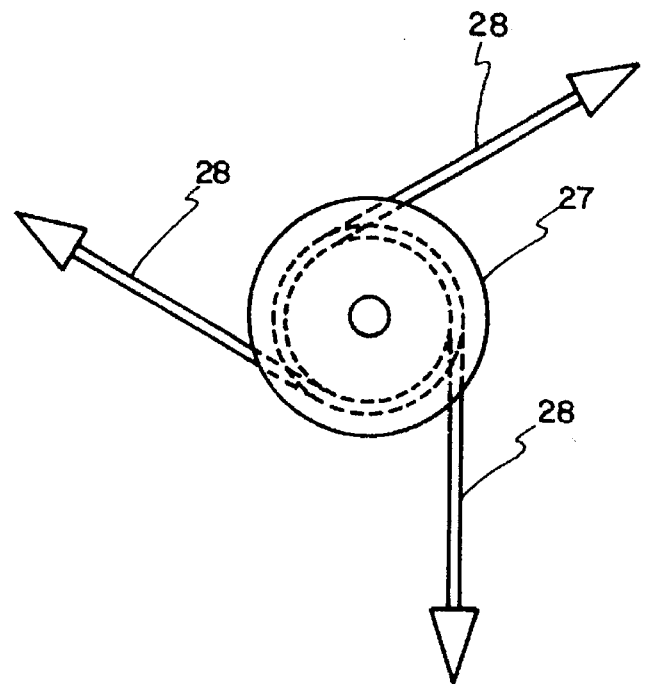
FIG. 7 is an elevational view of the take-up reel with four transmission cables operatively connected thereto.
Figure 8:
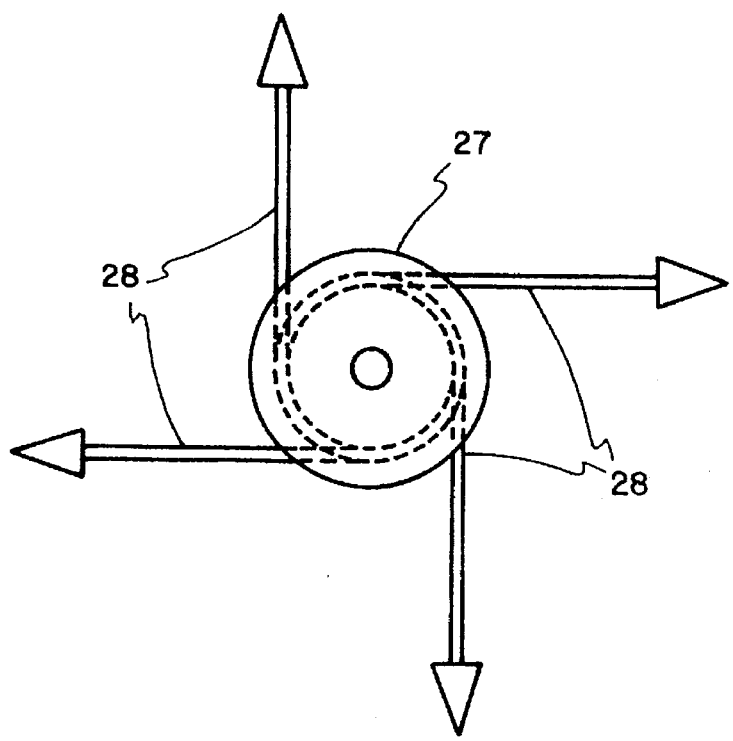
FIG. 8 is an elevational view of the take-up reel with five transmission cables operatively connected thereto.
Figure 9:
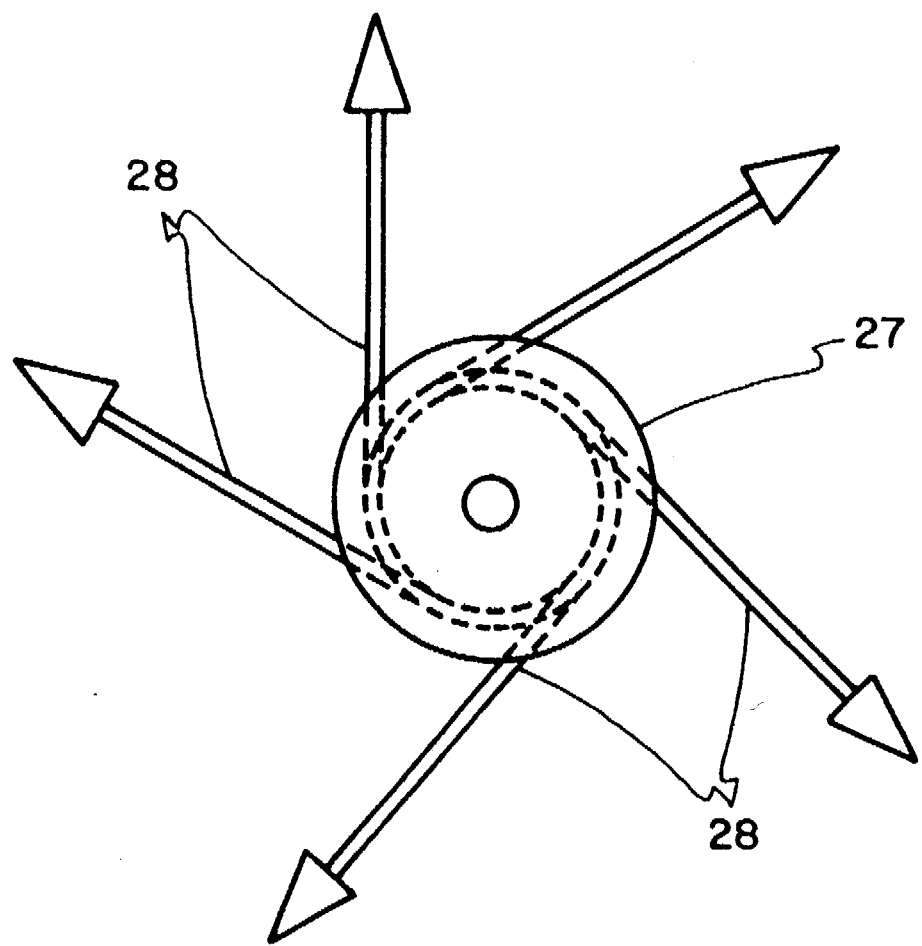

At least two energy storage portions 12 are provided with at least two force transmission cables 28 attached to take-up reel 27. These at least two transmission cables are attached to the take-up reels and are fed thereonto and therefrom by transmission pulleys 29 on opposite sides of the reel 27 as can clearly be seen in FIG. 1 and 6.

The above configuration eliminates eccentric loads that would be inherent in a single load application. If adequate space is available for additional energy storage portions 12, three, four, five, or more force transmission cables 28 can be attached to the take-up reel 27. This would be particular useful where heavy loads are associated with the vehicle portion 11.

Engine drive shaft 35 is operatively connected to on one end to engine 45 and to power clutch 36 on the other end. Clutch 36 is composed of clutch plates 37 and 38. Clutch plate 37 is operatively connected to engine drive shaft 35 while clutch plate 38 is operatively connected to one end of drive shaft 39. The opposite end of such drive shaft is operatively connected to the forward and reverse gear box 21.

A strain gauge or similar torque sensing means 40 is mounted adjacent to anchor attachment 34 and is operatively connected to elastomeric band 33. This sensing switch 40 is connected by wire 41 to microprocessor 42.

Microprocessor 42 is also connected by wire 43 to reel limit brake 27'.

In addition to wire 41 connected to the torque sensing means 40, the output of processor 42 is also operatively connected, by wire 45 to drive clutch 23, by wire 46 to forward and rear gear box 21, and by wire 47 to power clutch 36. The input side of the microprocessor 42 is also connected by wire 48 to brake pedal position sensor 49, by wire 52 to accelerator position sensor 51, and by wire 52 to vehicle forward and reverse selector 53.

The trailer mounted energy storage system, indicated generally at 54, includes drive wheels 13, operatively connected to gear box 21 which in turn is operatively connected to the energy storage portion 12. The only thing that is not included as described above is the engine drive shaft and related clutch going into a gear box 21. The vehicle to which the trailer is connected would serve in this capacity. Also the trailer 54 includes a tongue 55, a trailer hitch 56, and a retractable trailer landing gear 27.

During initial use of the elastomeric energy storage system of the present invention, the energy storage system 12 would have enough tension to keep the elastomeric bands 33 and the limited stretch energy transmission cables 28 engaged on the respective pulleys 29 and 30 but the torque sensor 40 would signal the microprocessor 42 that no power was available.

When vehicle forward and reverse selector 53 in the vehicle portion 11 is be placed in the forward position, a signal is sent to the microprocessor through wire 52. The microprocessor is sent a signal through wire 45 to drive clutch 23 to disengage the same. At the same time, a signal is sent from the microprocessor 42, through wire 47, to the power clutch 36 to engage the same. Also a signal from the microprocessor 42, through wire 46, engages the forward drive in gear box 21. The engine 44, through drive shafts 35 and 39, gear box 21, and drive shaft 20, drives the differential 15 that drives one or both of the drive wheels 13 in the normal manner of such devices. The vehicle 11 can now be driven up to cruising speed using the engine in the normal manner of engine driven vehicles.

When it is desired to slow down or decelerate, the accelerator position sensor 51 senses this and sends a signal through wire 52 microprocessor 42. If the brake pedal 49 is applied, this also would send a signal through wire 48 to microprocessor 42. The microprocessor 42 then signals the power clutch 36, through wire 47, to disengage the same while at the same time a signal is sent through wire 45 to drive clutch 23 to engage the same. Drive shaft 22 gear box 21 will now turn drive shaft 26 which will rotate take-up reel 27 and cause the same to wind the force transmission cables 28 thereonto which will linearly stretch the elastomeric member 23 attached thereto. Thus the kinetic energy resulting from the forward movement of the vehicle 10 will be stored in the elastomeric energy storage system 12 which will slow the vehicle in the process.

When the vehicle 11 comes to a stop or has reached the desired decelerated speed and it is desired to again accelerate, the accelerator position sensor 51 will sense the depression of the accelerator pedal (not shown) and a signal will be sent through wire 52 to microprocessor 42 which in turn will send a signal through wire 46 to reverse the direction of rotation of drive shaft 22. Power clutch 36 between gear box 21 and engine 44 will remain disengaged. The linear kinetic energy stored in stretched elastomeric bands 33 will cause the force transmission cables 28 to unwind from take-up reel 27, first, through drive shaft 26, engage clutch 23, drive shaft 22 and gear box 21 will transmit acceleration power through drive shaft 22 to drive wheels 13 without requiring power to be supplied by the engine 44.

Once the desired speed has been reached, or the torque sensor 40 senses that all of the stored kinetic energy has been used, the microprocessor 42 will automatically disengage the drive clutch 23 while at the same time engaging the power clutch 36 which will allow the engine 44 to drive the vehicle 11 until it is again desired to decelerate, at this time the take-up reel 27 will again turn as herein above described to store linear kinetic energy in the elastomeric bands or member 33 of the two or more energy storage portions 12 operatively associated with the present invention.

If during the storage of linear kinetic energy in the energy storage portions 12, the maximum safe amount of energy that can be stored is reached, the torque sensor 40 will, through wire 41, send a signal to the microprocessor 42. The microprocessor will then, through wire 43, send a signal to reel limit brake 27'. This brake will stop the take-up reel 27 from turning. Simultaneously a signal is sent through wire 45 to drive clutch 23 to disengage the same. Thus the maximum amount of kinetic energy is stored and will be held in the energy storage portions 12 until needed. There is no energy loss due to slow down as is the case with the storing of kinetic energy in fly wheels nor power loss due to leakage of electric current that occurs in storage batteries.

From the above it can be seen that the present invention allows kinetic energy to be stored during deceleration of a vehicle in a highly efficient manner until such energy is again needed at which time, through the microprocessor, such energy can be reintroduced into the drive system of the vehicle to propel the same.

Since the average vehicle weighs thousands of pounds, the recovery and storage of kinetic energy which is usually lost during deceleration will greatly increase energy efficiency and save large amounts of money in reduced fuel costs.

Although the elastomeric energy storage system of the present invention has been described as used in conjunction with a vehicle, it is to be understood that there are many other applications where deceleration kinetic energy can be stored in an energy storage portion for later use as a driving force.

The present invention can, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A method of permanently storing kinetic energy of deceleration for acceleration of a motor vehicle, said vehicle including an engine, a gear box, a drive shaft, and a differential arranged in functional relation to drive the wheels of said vehicle, said vehicle further including a rotating shaft means being operatively connected to said gear box at one end thereof and to an energy storage means at an opposite end thereof, said method comprising the steps of:

introducing deceleration kinetic energy from said rotating shaft means into said energy storage means including at least one elastomeric member;

training said elastomeric member over a plurality of pulley means;

attaching said elastomeric member to an elongated energy transmission means;

winding said elongated energy transmission means on a take up reel means being operatively connected to said rotating shaft means;

controlling said energy storage means enabling said deceleration kinetic energy to be permanently stored therein by stretching said at least one elastomeric member;

securing said at least one elastomeric member in a stretched condition such that said kinetic energy is permanently stored therein;

releasing said permanently stored kinetic energy for acceleration of said vehicle by slackening said at least one elastomeric member; and applying said stored kinetic energy to said drive shaft of said vehicle to drive said wheels.

2. The method of claim 1 wherein said step of controlling further comprises the steps of:

coupling said rotating shaft means to a drive clutch means being operatively connected to a gearbox means, said gearbox means being simultaneously connected to an engine means including power clutch means; and coordinating the operation of said rotating shaft means, said drive clutch means, said gearbox means, said power clutch means, said engine means, said take-up reel means and said energy storage means enabling said deceleration kinetic energy to be alternately stored and released for acceleration purposes.

3. The method of claim 2 wherein the step of coordinating is carried out by a microprocessor.

4. The method of claim 2 wherein the step of coordinating further comprises the steps of:

monitoring the torque of said elastomeric member by strain sensing means;

engaging said rotating shaft means to wind up said elastomeric member;

disengaging said rotating shaft means when a maximum safe amount of deceleration kinetic energy has been stored; and reversing the direction of rotation of said rotating shaft means to unwind said elastomeric member enabling said stored energy to be released for acceleration purposes.

* * * * *